United States Patent [19]

Strovinskas

[11] Patent Number: 4,973,106
[45] Date of Patent: Nov. 27, 1990

[54] REMINDER DEVICE FOR WEARING SEAT BELTS

[76] Inventor: Linda M. Strovinskas, 5571 Aven Rd., Marietta, Ga.

[21] Appl. No.: 408,297

[22] Filed: Sep. 18, 1989

[51] Int. Cl.$^5$ ............................................. B60R 22/10
[52] U.S. Cl. .................................. 297/482; 280/801; 446/28
[58] Field of Search ............... 297/482, 463, 487, 488; 280/801; 446/28

[56] References Cited

U.S. PATENT DOCUMENTS

| | | | |
|---|---|---|---|
| 2,593,218 | 4/1952 | Swain | 446/28 |
| 3,616,571 | 11/1971 | Adickes | 446/28 |
| 4,482,187 | 11/1984 | Nagashima et al. | 297/485 X |
| 4,502,732 | 3/1985 | Williams | 297/488 |
| 4,595,618 | 6/1986 | Caringer | 428/100 |
| 4,715,839 | 12/1987 | Ford et al. | 446/28 |
| 4,759,588 | 7/1988 | Husnik | 297/482 X |

FOREIGN PATENT DOCUMENTS 3019378 11/1981 Fed. Rep. of Germany ...... 297/482

OTHER PUBLICATIONS

"Buckle Up Buddie" Company, Nov. 1986.

*Primary Examiner*—Peter R. Brown
*Attorney, Agent, or Firm*—H. Jay Spiegel

[57] ABSTRACT

The reminder device for seat belt use relates to a character figure wearing a seat belt having means to attach the character figure to a vehicle seat belt so as to act as a reminder to people to wear a seat belt.

2 Claims, 2 Drawing Sheets

REMINDER DEVICE FOR WEARING SEAT BELTS

BACKGROUND OF THE INVENTION

The present invention relates to a character figure wearing a seat belt and designed to be attached to a seat beat as a reminder to people to use a seat belt. Recently, legislation has been enacted requiring drivers and passengers of vehicles to wear seat belts while the vehicle is in operation. As a result of such legislation children are now required by law to be seat belted while seated in an automobile or other such vehicle. As such, a need has developed for children to be motivated to buckle up their seat belts when seated in such vehicles. The present invention satisfies this need by offering an attractive and appealing reminder device in the form of a character figure attachable to a seat belt. Although characters associated with various restraining devices are known, applicant is unaware of any such device that contains of the features of the present invention as set forth here and below. The following prior art is known to applicant:

U.S. Pat. No. 4,595,618 to Caringer discloses a concept of an entertainment device in combination with a seat belt. However, Caringer does not include all of the features of the present invention including a character figure having a simulative seat belt thereon wherein the character figure attaches to a seat belt by means that prevent entanglement of the seat belt during extension or retraction thereof.

U.S. Pat. No. 4,695,092 Hittie discloses the concept of a padded liner, primarily for use in a child's safety automobile seat preferable in the form of a character, the structure of the liner designed to accommodate, secure and adapt to the growth pattern of a child. Hittie differs from the present invention in that the references does not teach a character wearing a seat belt capable of being attached to a seat belt to act as a reminder for people to wear a seat belt.

SUMMARY OF THE INVENTION

The present invention relates to a new and improved reminder device to act as a message to people, especially to children, to motivate them to use a seat belt. The present invention includes the following interrelated features and aspects:

(a) In a first aspect, the present invention a character figure is provided wearing a simulative seat belt and having means to attach the character figure to a seat belt.

(b) The attaching means can also act as a guide means such a seat belt when being retracted is maintained in an untwisted manner so as not to become entangled in or at the retracting mechanism.

(c) The characters may be made in a variety of likelinessses to coincide with animals, dolls, or people whose occupations would normally have them driving vehicles, for example, policemen, firemen or taxi cab drivers. Additionally, an appropriate printed message may be included on a portion of the character figure to act as further reminder of the importance of wearing seat belts.

(d) The characters may be sold individually or collectively, in toy car such that when packaged for sale, the characters appear to be seat belted in a toy car.

Accordingly, it is a first object of the present invention to provide a reminder to people of all ages to wear their seat belts.

It is further object of the present invention to provide the reminder device in the form of a character figure wearing a simulative seat belt, the character being attachable to the seat belt in a vehicle.

It is yet a further object of the present invention to provide a character in a variety of likenesses that may have names and messages related to wearing seat belts associated therewith.

It is a yet further object of the invention to have the reminder device of the present invention to act as a guide means for seat belts to prevent entanglement thereof during retraction.

These and other aspects of the present invention will be better understood from the following detailed description of the preferred embodiment when read in the conjunction with the appended drawing figures.

SPECIFIC DESCRIPTION OF THE PREFERRED EMBODIMENTS

Figure 1:
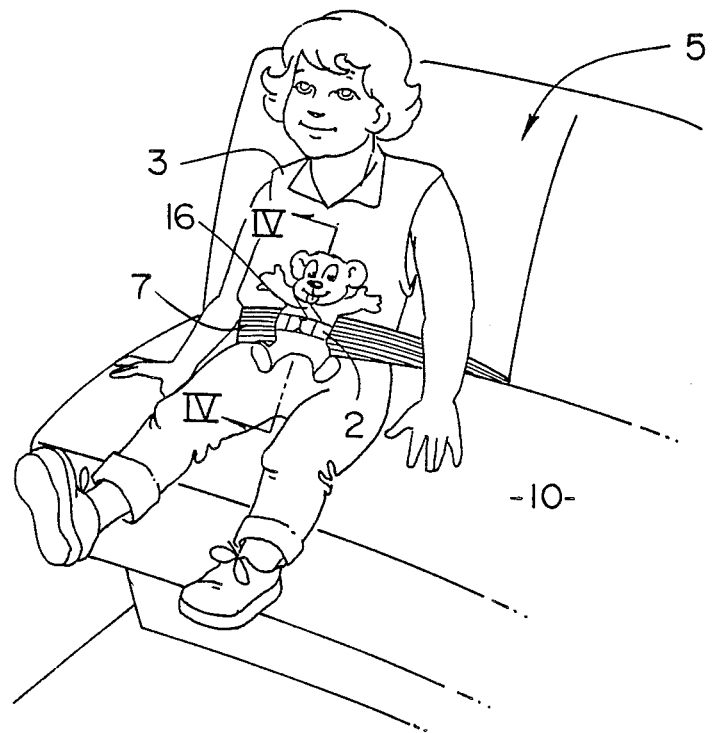
FIG. 1 shows a front view of an exemplary embodiment of the remainder device of the present invention in use.

With reference first by to FIG. 1, the reminder device of the present invention is generally designated as reference numeral 10 and seems to include character FIG. 1 made in the likeness of a teddy bear having a simulative seat belt 2 attached thereto. The simulative seat belt 2 having a shoulder strap portion 16 may be integrally attached to the character figure or may contain fastening means to allow detachment therefrom. With further reference to FIG. 1, a passenger 3 is depicted as seated in a vehicle seat 5 wearing a seat belt 7 with the device of the present invention 10 attached to the seat belt 7.

Figure 2:
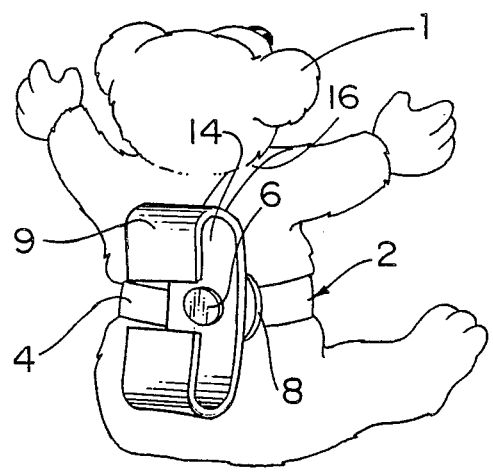
FIG. 2 shows a rear view perspective view of an exemplary embodiment of the present invention.

With reference to FIG. 2, a rear perspective view of the reminder device of the present invention is shown further illustrating attachment means 9. As can be seen from the drawings, attaching means 9 is in the shape of an elliptical ring having a opening 14 with split 4 such that a seat belt may slip through split 4 and occupy opening 14. As an exemplary embodiment FIG. 2 shows attachment means 9 connected to character FIG. 1 by snap means 6 and snap receptacle 8. However, other fastening means may be used to connect the attaching means 9 to character FIG. 1 such as hook and pile means or buttons. Furthermore, attachment means 9 may also be integral with character FIG. 1 using any conventional means.

The elliptical ring design of the attachment means 9 allows a seat belt to be inserted through split 4 such that the seat belt may slide within the attachment means 9. The attachment means 9 may then also act as a guide means for the seat belt to prevent entanglement thereof during extension or retraction thereof.

Figure 3:
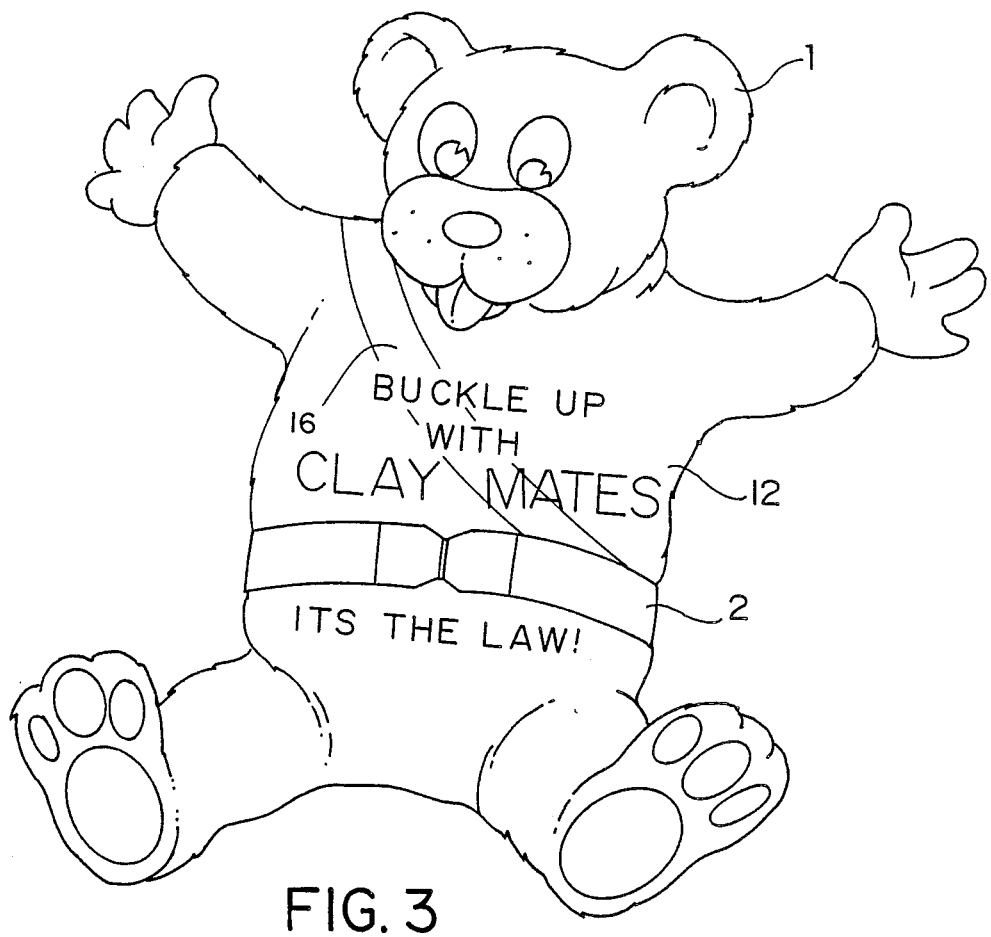
FIG. 3 shows a front view of an exemplary embodiment of the present invention depicting greater detail.

FIG. 3 illustrates a front view of the reminder device showing in greater detail a printed message 12 on the character FIG. 1. Although the message "Buckle up with Clay Mates, its the law" is depicted as an exemplary message, any printed message may be shown that is related to conveying a message about wearing seat belts. The printed message may be located on a portion of the character figure itself, the simulative seat belt or a combination of both.

Figure 4:
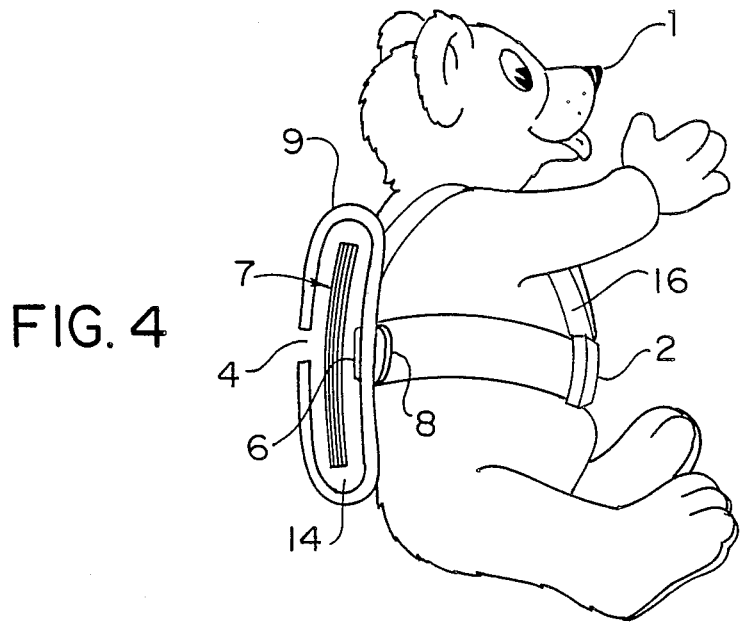
FIG. 4 shows a cross-sectional view along the line IV—IV of FIG. 1.

With reference to FIG. 4, a cross-sectional view along the line IV—IV of FIG. 1 better illustrates the reminder device of the present invention as attached to a seat belt. As can be seen from the drawing, seat belt 7 occupies opening 14 of the elliptical ring 9 thereby allowing character FIG. 1 to be connected to the seat belt 7 as well as enabling seat belt 7 to be guided by attachment means 9 during movement thereof. Although not shown, the character figure and elliptical ring 9 may also be adapted to slip over the shoulder strap portion 16 of a seat belt to act as a seat belt guide for cars that utilize extension and retraction means for shoulder straps rather than lap belts.

The character figures of the present invention may come in the likeness of any type of animate beings such as animals or doll figures. Additionally, the character figures may depict people whose occupations would normally have them driving a vehicle such as firemen or policemen. The characters may also be fashioned wearing clothing that may be integral with the character figure or removable therefrom to further enhance the type of character figure intended.

The character figure and attachment means may be made from any desired material and in any desired dimensions. Preferred materials for the character figure would include soft fabrics or the like so as to prevent any injury to seat belt wearers. Materials for the attachment means would include any material having sufficient strength to maintain the opening of the attachment means such that a seat belt may be guided therethrough during extension of retraction thereof to prevent entanglement. Such materials may include plastics, wood or metal.

The present invention provides a new and useful reminder device to motivate people of all ages, especially children, to buckle up their seat belts while driving or riding in a vehicle. Additionally, the reminder device acts as a guide means to prevent entanglement of a seat belt during retraction. The reminder device may also be sold individually or collectively in toy cars to assimilate the appearance of people wearing seat belts while riding in a vehicle.

As such, an invention has been disclosed in terms of a preferred embodiment thereof which fulfills each and every one of the objects of the present invention as set hereinabove and provides a new and improved reminder device to motivate people to wear their seat belts of great utility and novelty. Of course, many changes, modifications and alterations in the teachings of the present invention may be contemplated by those skilled in the art without departing from the intended spirit and scope thereof. As such it is intended that the present invention only be limited by the terms of the appended claims.

I claim:

1. An improved reminder device for people to remember to wear a seat belt comprising:
   (a) a character figure having the likeness of an animate being, said character figure having a simulative seat belt attached thereto; and
   (b) an attachment means removably mountable on said character figure for attaching said character figure to a seat belt, said attachment means further comprising a rigid elliptically shaped ring, said elliptically shaped ring having a split therein, said split permitting a said seat belt to pass therethrough, whereby said elliptically shaped ring is adapted to guide said seat belt during extension and retraction thereof to prevent entanglement.

2. The reminder device of claim 1 wherein said character figure has indicia means thereon relating to a reminder to wear a seat belt.

* * * * *